US006367157B1

(12) United States Patent
Diez

(10) Patent No.: US 6,367,157 B1
(45) Date of Patent: Apr. 9, 2002

(54) SYSTEM FOR ADJUSTING THE TRACK ON MOTOR VEHICLE WHEELS

(75) Inventor: Ulrich Diez, Reichshof (DE)

(73) Assignee: Snap-On Deutschland Holding GmbH, Mettmann (DE)

( * ) Notice: Subject to any disclaimer, the term of this patent is extended or adjusted under 35 U.S.C. 154(b) by 0 days.

(21) Appl. No.: 09/246,699

(22) Filed: Feb. 9, 1999

(30) Foreign Application Priority Data

Feb. 9, 1998 (DE) ............................... 198 05 102

(51) Int. Cl.[7] .................. G01B 11/26; G01B 13/18; G01B 21/22; G01B 5/24; G01B 7/30
(52) U.S. Cl. .................. 33/203.18; 33/203; 33/203.12; 33/600; 33/645; 33/783; 33/787
(58) Field of Search .................. 33/203.18, 203.19, 33/203.2, 203, 600, 203.1, 203.12, 203.15, 203.16, 203.17, 645, 613, 783, 787

(56) References Cited

U.S. PATENT DOCUMENTS

| | | | | | |
|---|---|---|---|---|---|
| 1,440,067 | A | * | 12/1922 | Duby | 33/203.2 |
| 1,477,450 | A | * | 12/1923 | Sandbo | 33/203.2 |
| 1,761,516 | A | * | 6/1930 | Bushey | 33/203.2 |
| 1,894,370 | A | * | 1/1933 | Erickson | 33/203.2 |
| 2,003,188 | A | * | 5/1935 | Heid | 33/203.2 |
| 2,356,544 | A | * | 8/1944 | Swanson | 33/809 |
| 2,509,466 | A | * | 5/1950 | Leach | 33/203.2 |
| 2,522,916 | A | * | 9/1950 | Zeigler | 33/203.2 |
| 2,552,178 | A | * | 5/1951 | James | 33/203.2 |
| 2,618,862 | A | * | 11/1952 | Jezek | 33/203.2 |
| 2,664,644 | A | * | 1/1954 | Tyerman | 33/203.2 |
| 2,740,201 | A | * | 4/1956 | Swanson | 33/809 |
| 3,128,561 | A | * | 4/1964 | Payne | 33/203.2 |
| 3,277,579 | A | * | 10/1966 | Murphy | 33/809 |
| 3,522,658 | A | * | 8/1970 | Howell | 33/809 |
| 3,531,870 | A | * | 10/1970 | Romancky | 33/809 |
| 4,158,896 | A | * | 6/1979 | Farkas | 4/558 |
| 4,517,966 | A | * | 5/1985 | Von Othegraven | 482/122 |
| 4,527,338 | A | * | 7/1985 | Dickinson et al. | 33/809 |
| 4,625,419 | A | * | 12/1986 | Beissbarth | 33/203.17 |
| 4,824,302 | A | * | 4/1989 | Schultheis et al. | 410/151 |
| 5,084,979 | A | * | 2/1992 | Brosher et al. | 33/203.18 |
| 5,107,374 | A | * | 4/1992 | Lupo et al. | 359/841 |
| 5,317,813 | A | * | 6/1994 | Reed | 33/809 |
| 5,358,225 | A | * | 10/1994 | Volpel et al. | 267/64.12 |
| 5,414,942 | A | * | 5/1995 | Moore et al. | 33/809 |
| 5,555,673 | A | * | 9/1996 | Smith | 47/1.5 |
| 5,678,843 | A | * | 10/1997 | Liu | 280/655 |
| 5,685,082 | A | * | 11/1997 | Proulx | 33/296 |
| 5,873,175 | A | * | 2/1999 | Johnston | 33/809 |
| 5,926,961 | A | * | 7/1999 | Uhl | 30/296.1 |
| 6,081,965 | A | * | 7/2000 | Kupfer | 16/86 R |
| 6,267,336 | B1 | * | 7/2001 | Ruckstadter | 248/118.3 |

FOREIGN PATENT DOCUMENTS

| | | | | |
|---|---|---|---|---|
| FR | 678966 | * | 4/1930 | 33/203.2 |
| GB | 394090 | * | 6/1933 | 33/203.2 |

* cited by examiner

Primary Examiner—Diego Gutierrez
Assistant Examiner—Yaritza Guadalupe
(74) Attorney, Agent, or Firm—Shook, Hardy & Bacon L.L.P.

(57) ABSTRACT

A telescoping bar includes a track pusher for adjusting and measuring the track on a motor vehicle's wheels. A pneumatic spring, housed within the telescoping bar, functions as an accumulator and applies expansion forces on either the two front wheels or two rear wheels of the vehicle.

6 Claims, 2 Drawing Sheets

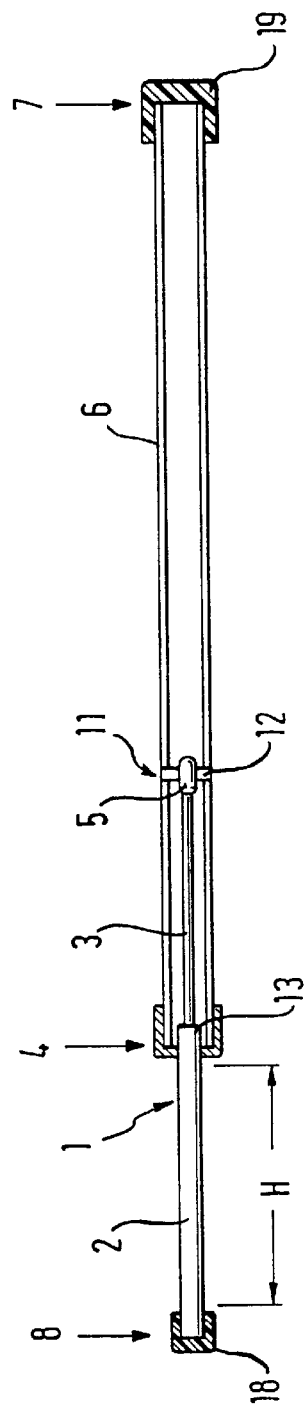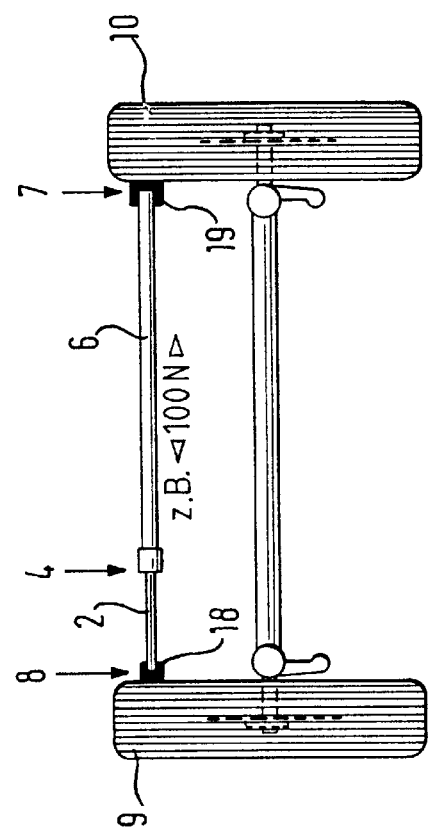

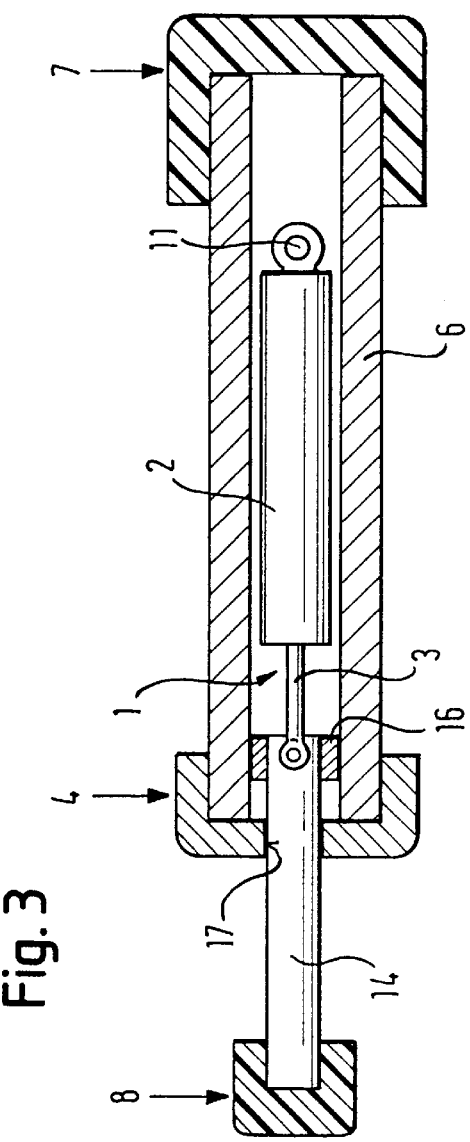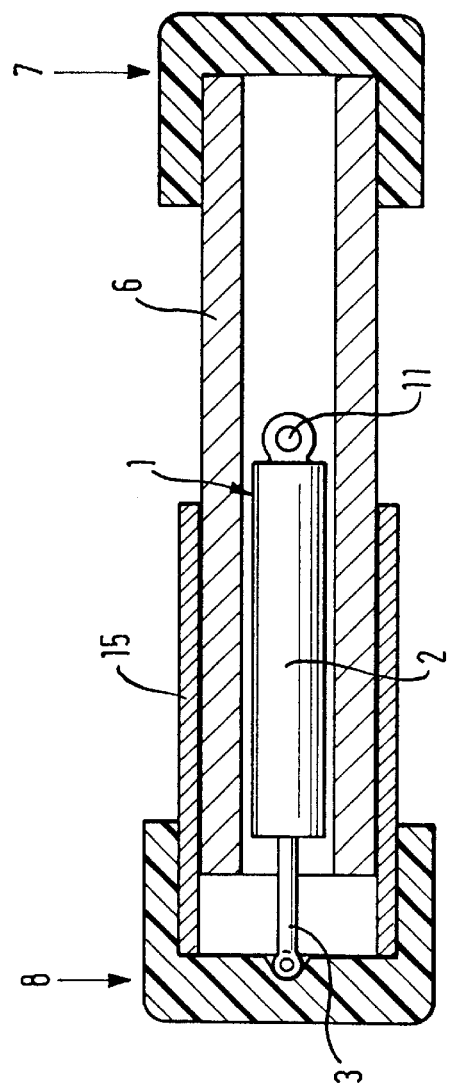

SYSTEM FOR ADJUSTING THE TRACK ON MOTOR VEHICLE WHEELS

FIELD OF THE INVENTION

The invention relates to an alignment device for motor vehicles.

SUMMARY OF THE INVENTION

The present invention is a system used for adjusting and measuring the track of a motor vehicle's wheels. The system includes a telescoping bar, which is adjustable in length and includes a spring that functions as a accumulator. The two opposing ends of the telescoping bar exert expansion forces on either the two front wheels or the two rear wheels of a vehicle. Such a system, also designated as a track pusher, exerts a specific initial stressing force, for example 100 N onto the vehicle's wheels. However, in known systems, a mechanical spring, in particular a compression spring, serves to produce the initial stressing force onto the wheels. In conventional systems where attempts have been made to measure several different vehicles that include different vehicle track widths, the strokes of the mechanical spring may produce imprecise and divergent expansion forces.

Thus, an objective of the invention is to create a system for adjusting the track on the wheels of a motor vehicle, in which a constant expansion force is supplied throughout the stroke.

One embodiment of the invention includes a pneumatic spring that serves as an accumulator. This embodiment includes a pneumatic spring housing and a piston rod telescoping axially out of the pneumatic spring housing with a certain force, e.g. 100 N. The pneumatic spring slidably attaches to the piston rod, which includes two attachment points that connect to a telescoping bar. Furthermore, during the stroke of the piston rod's as it moves out of the pneumatic spring housing, an axial guiding arrangement of the telescopically adjustable bar supports the piston rod radially. In this manner, the invention guarantees that forces acting on the relatively thinly-designed piston rod act only in the axial direction, in which the spring force is essentially transferred.

During operation, one end of the pneumatic spring housing may be pressed against one wheel of the motor vehicle, for example, the left front wheel. In this connection, the end of the housing forms one end of the telescoping bar. The free end of the piston rod may be attached and/or supported on the bar-shaped guiding arrangement designed, in particular, as a tube. The pneumatic spring housing may be guided axially by a certain stroke exerted, for example, by on one end of the guiding arrangement. The other end of the guiding arrangement, which forms the other end of the telescoping bar, may be pressed against the other wheel of the motor vehicle, for example, the right front wheel.

In addition, several embodiments of the invention are possible in which the pneumatic spring housing supports a pneumatic spring within a guiding arrangement. The guiding arrangement may be supported against one wheel of the motor vehicle with an end portion that forms an end of the telescoping bar. The piston rod connects to an end of the telescoping bar so that support against the other wheel may be achieved. For instance, the piston rod may connect directly with one end of the telescoping bar, whereby the piston rod may be supported radially against the guiding arrangement during its axial movement or so that the end of the telescoping bar has one or more guide parts that may slide axially on the guiding arrangement.

The guiding arrangement may be designed tubular, so that the guiding arrangement supports the pneumatic spring housing, which mounts inside the tubular guiding arrangement.

The embodiments of the invention ensure that a constant initial stressing force, for example of 100 N, is exerted over the entire range of track width.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 1 is a partial sectional view of a first embodiment according to the invention;

FIG. 2 illustrates an exemplary installation of the invention of FIG. 1 installed as a track pusher on two front wheels of a motor vehicle;

FIG. 3 is a sectional view of a second embodiment according to the invention; and FIG. 4 is a sectional view of a third embodiment according to the invention.

DETAILED DESCRIPTION OF PREFERRED EMBODIMENTS

FIGS. 1–4 illustrate various embodiments according to the invention of systems that may be employed to adjust and align the track on the wheels of a motor vehicle. The exemplary embodiment of FIG. 1 illustrates a track pusher that includes a pneumatic spring 1, which serves as an accumulator. The pneumatic spring 1 comprises a cylindrical, tubular pneumatic spring housing 2 and an axially sliding piston rod 3 that protrudes from one end of the pneumatic spring housing 2. A certain initial stressing force, which may be produced in a known manner by a hydropneumatic arrangement arranged within the pneumatic spring housing 2, acts on the sliding piston rod 3 during operation. This initial stressing force may be, for example, approximately 100 N.

A first free end 5 of the piston rod 3 attaches at a point of attachment 11 on a bar-shaped guiding arrangement 6 so that the pneumatic spring housing 2 and the piston rod 3 are guided axially within the guiding arrangement 6. The point of attachment 11 may include two diametrically opposite points of attachment 11 for supporting and securely attaching the first free end 5 of the piston rod 3 to the guiding arrangement 6. Attachment of the point of attachment 11 to the guiding arrangement 6 may be established, for example, by a transverse pin 12. The distance of the point of attachment 11 from a first end 4 of the guiding arrangement 6 corresponds to at least the stroke H by which the piston rod 3 may telescope out of the pneumatic spring housing 2. When the piston rod 3 fully extends so that it is completely telescoped, a first end 13 of the pneumatic spring housing 2 remains retained within the first end 4 of the guiding arrangement 6. In the exemplary embodiment of FIG. 1, the first end 4 of the guiding arrangement 6 guides telescopically the pneumatic spring housing 2. The guiding arrangement 6 bar-shaped design may be designed as a tube having various configurations, e.g., a slit tube 6, a fully encased tube or a tubular jacket. The guiding arrangement 6 comprises a cavity in which the piston rod extends axially. The pneumatic spring housing 2 may also be pushed into the cavity of the guiding arrangement 6 by the force of the stroke H exerted against the initial stressing force of the pneumatic spring 1 accumulator.

As depicted in FIGS. 1 and 2, the second free end 8 of the pneumatic spring housing 2 may be equipped with a pressure cap 18 made from materials such as plastic, hard rubber or other similar flexible but durable substances. As illustrated in FIG. 2, the second free end 8 of the pneumatic spring housing 12 may press against a front wheel 9, e.g. the left front wheel, of a motor vehicle. In this manner, the second free end 8 serves as a bar end 8 of the telescoping bar. Pressing against the other front wheel, a second end 7 of the of the guiding arrangement 6, provided with a pressure cap 19, also fictions as a bar end. In this configuration, the pressure caps 18 and 19 press against the inner surfaces of the tires of the two wheels 9 and 10, respectively, as FIG. 2 shows. The accumulator of the pneumatic spring 1 exerts an expanding action via the two ends 7 and 8 of the telescoping bar on the two wheels. Since the initial stressing force of the pneumatic spring 1 supplies a constant force over the range of the width of the vehicle's track, the track pusher according to the invention achieves a high degree of precision in measuring track adjustments and alignments.

FIGS. 3 and 4 illustrate further examples of executing exemplary embodiments according to the invention. In the examples of FIGS. 3 and 4, the pneumatic spring 1 mounts inside the guiding arrangement 6 (tubular guide). The guiding arrangement 6 supports the pneumatic spring 1 by way of attachment at the point of attachment 11 of the guiding arrangement 6. In this embodiment, the second end 7 of the guiding arrangement 6 presses against the wheels of a motor vehicle during expansion. Meanwhile in FIG. 3, an attachment mechanism 14 connects to the piston rod 3, which can be moved telescopically out of the pneumatic spring housing 2 essentially with a constant force exerted by a certain stroke. In the example of execution shown in FIG. 3, the piston rod 3 connects with end 8 of the telescoping bar via an attachment mechanism 14, which may be a tappet, that is guided axially on the guiding arrangement 6 via two support points. In comparison to FIG. 3, the piston rod 3 of FIG. 4 connects directly with the axially sliding end 8 of the telescoping bar. The ends 7 and 8 of the bar in the examples of FIGS. 3 and 4 may also be designed in the form of plastic caps or the like.

In FIG. 3, the two support points, supported radially on the guiding arrangement 6, provide the axial guiding for the tappet 14. In FIG. 3, the two support points forms a piston-like widening 16 that attaches at the end of the tappet 14 which connects to the piston rod 3. The piston-like widening 16 rests slidably within the inner wall of the tubular guiding arrangement 6. As a further axial support point, a guiding bore 17, provided within the sealing cap at end 4 of the guiding arrangement 6, radially supports the tappet 14, as the tappet 14 slides within the bore. In this manner, the telescoping bar provides simultaneous radial support of the piston rod 3, as well as axial support. The spring force of the pneumatic spring 1 transfers essentially in the axial direction onto the end 8 of the telescoping bar via the piston rod 3.

In FIG. 4, a guiding part 15 rigidly connects with end 8 of the telescoping bar. The guiding part 15 mounts form-fittingly onto and slides axially on the guiding arrangement 6. At the same time, the guiding part 15 ensures radial support of end 8 of the telescoping bar on the guiding arrangement 6. Thus, the embodiment of FIG. 4 provides simultaneous radial and axial support for the piston rod 3 on the guiding arrangement 6, so that the spring force exerted by the pneumatic spring 1 transfers essentially in the axial direction onto the end 8 of the bar. In FIG. 4, the tubular design of the guiding part 15 rests against the outside of the tubular guiding arrangement 6. However, it is also possible for the guiding arrangement 6 as well as the guiding part 15 to include slitted guide tubes that interlock at their guide fingers.

What is claimed is:

1. An apparatus for adjusting the track of two wheels mounted on different sides of a vehicle, comprising:
    a telescoping bar having two opposing ends each being supported against one of the two wheels;
    one end of said telescoping bar comprising a first end of a spring housing of a pneumatic spring;
    the other end of said telescoping bar comprising a first end of a tubular guide, wherein said spring housing is guided so as to slide axially within said tubular guide and said first end of said spring housing is capable of extending beyond a second end of said tubular guide;
    a piston rod that protrudes with its free end from and moves relative to a second end of said spring housing with a constant force generated by said pneumatic spring along a predetermined stroke; and
    said tubular guide having a cavity in which said free end of said piston rod is fixedly attached.

2. An apparatus according to claim 1, said piston rod attaches to said guiding arrangement at a point of attachment.

3. An apparatus according to claim 2, wherein said point of attachment includes a distance extending from said second end of said tubular guide corresponds to at least said predetermined stroke.

4. An apparatus for adjusting the track of two wheels mounted on different sides of a vehicle, comprising:
    a telescoping bar having two opposing ends each being supported against one of the two wheels;
    one end of said telescoping bar comprising a first end of a tappet;
    the other end of said telescoping bar comprising a first end of a tubular guide;
    a piston rod that protrudes with its free end from and moves relative to a spring housing of a pneumatic spring with a constant force generated by said pneumatic spring along a predetermined stroke;
    said tubular guide having a cavity in which said spring housing is placed and supported;
    said first end of sad tappet is capable of extending beyond a second end of said tubular guide;
    a second end of said tappet is connected to the free end of said piston rod; and
    said tappet is guided by a piston-like widening at said second end of the tappet and by a guiding bore, provided within a sealing cap at the second end of said tubular guide so as to slide axially within said cavity of said tubular guide.

5. An apparatus for adjusting the track of two wheels mounted on different sides of a vehicle, comprising:

a telescoping bar having two opposing ends each being supported against one of the two wheels;

one end of said telescoping bar comprising a first end of a guide part;

the other end of said telescoping bar comprising a first end of a tubular guide;

said guide part mounts form-fittingly onto and slides axially on said tubular guide;

a piston rod that protrudes with its free end from and moves relative to a first end of a spring housing of a pneumatic spring with a constant force generated by said pneumatic spring along a predetermined stroke;

said tubular guide having a cavity in which said spring housing is placed and supported;

said free end of said piston rod supported radially by said guide part during axial movement along said predetermined stroke; and wherein said guide part is capable of extending beyond a second end of said tubular guide.

6. An apparatus according to claim 5, wherein said guide part moves relative to said tubular guide and forms a closure with said tubular guide.

* * * * *